Sept. 10, 1963 P. M. FORNITI ET AL 3,103,160
PICNIC GRILL
Filed Dec. 6, 1961 5 Sheets-Sheet 1

INVENTORS
Philip M. Forniti
French Eugene Smith

BY *Strauch, Nolan & Neale*

ATTORNEYS

INVENTORS
Philip M. Forniti
French Eugene Smith

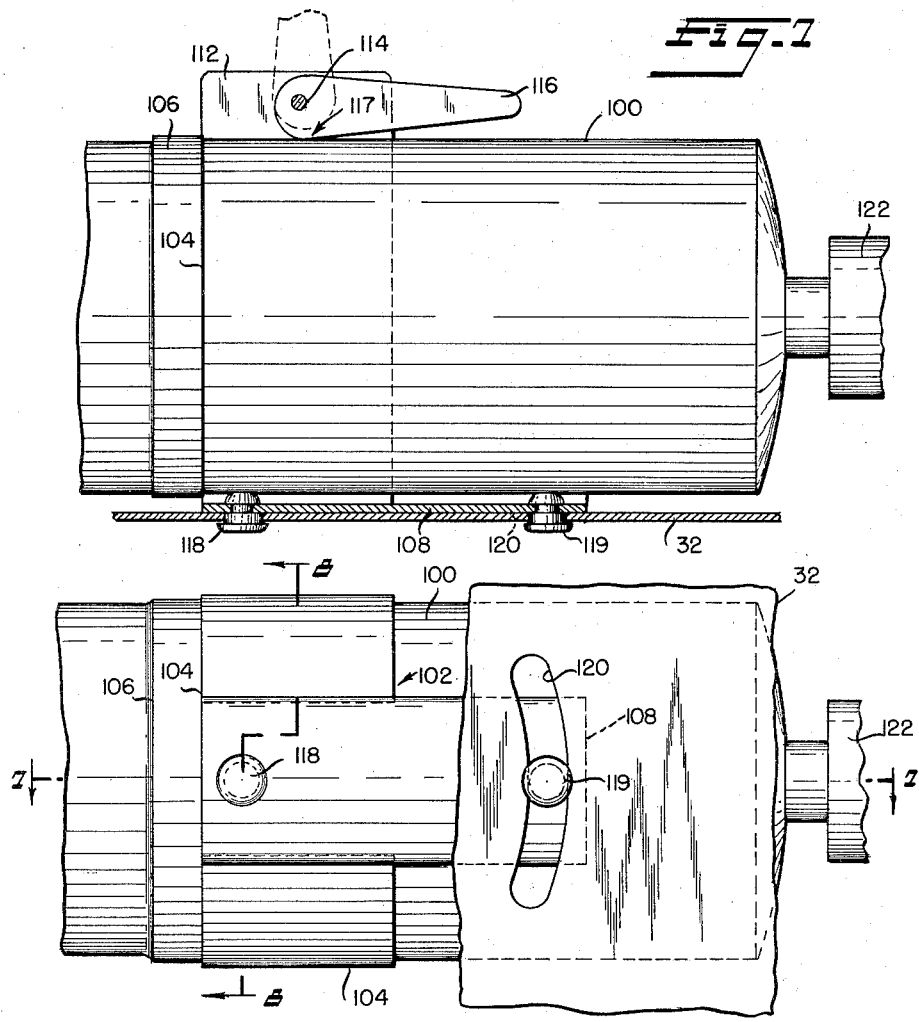

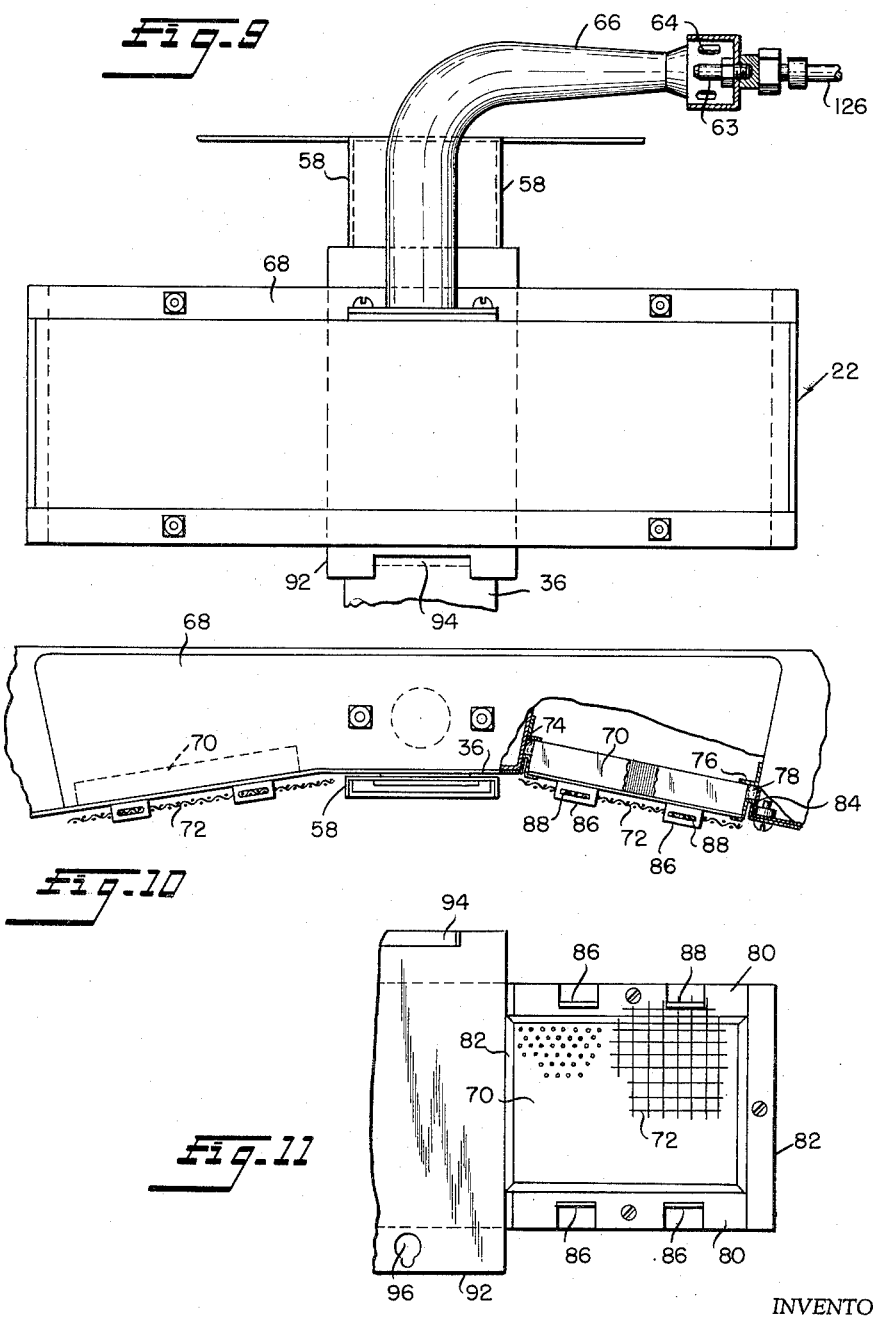

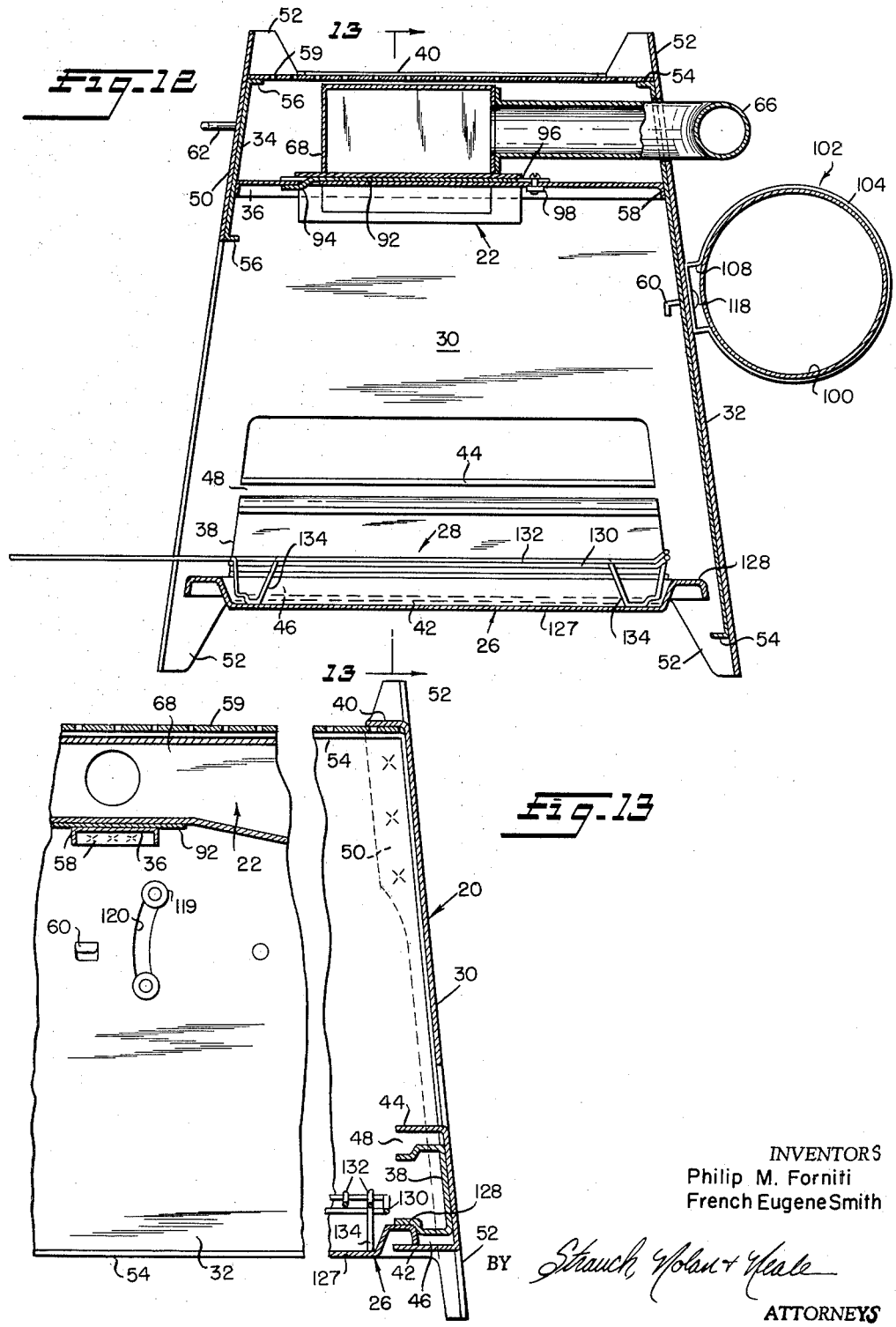

United States Patent Office 3,103,160
Patented Sept. 10, 1963

3,103,160
PICNIC GRILL
Philip M. Forniti, Cleveland, and French Eugene Smith, Akron, Ohio, assignors to Hupp Corporation, Cleveland, Ohio, a corporation of Virginia
Filed Dec. 6, 1961, Ser. No. 157,418
5 Claims. (Cl. 99—339)

This invention relates to portable stoves, more especially to such stoves using bottled gas as fuel, and transmitting the heat generated by combustion of the gas as infra-red radiation for cooking or heating purposes, primarily for use outdoors.

The modern trend toward outdoor living has created a great demand for portable stoves suitable for use on picnics, or for camping or fishing trips or on boats. Such stoves also serve as emergency heating or cooking devices when gas and electric power are not available.

Stoves for such purposes must be compact and lightweight, but must have sufficient capacity to cook food for a large number of people, and must be versatile enough to be usable for broiling, frying, grilling, toasting, boiling, baking or warming food or for space heating.

In stoves of this class, it is desirable to carry on broiling and toasting operations with the burner above the food to be cooked, directing radiant heat downward, or to do other cooking operations with the burner below the food directing its heat upward. For heating purposes, it is also desirable to be able to direct radiant heat in a generally horizontal direction.

For outdoor use away from gas or power lines, liquefied propane gas in small tanks makes an ideal fuel, since one-pound metal bottles of such gas are available at low cost in most hardware and sporting goods stores, can be readily transported, can be left attached to the stove ready for instant operation, and are safe since there is no handling of open fuel as in the case when using gasoline. This fuel also eliminates the dirt, starting problems and wasted time inherent in the use of solid fuels such as charcoal.

For transmitting the heat produced by the combustion of this fuel, the use of radiant, infra-red burners results in high efficiency and uniform cooking since the heat can be directed to the specific areas where it is required.

The application of such burners (operating on fuel from a small propane container permanently attached to the device) to a stove suitable for all the types of cooking described above, and intended for outdoor use, gives rise to a number of problems which must be solved to provide an apparatus suitable for the purpose. For example, the fuel tank must be arranged so that gas rather than liquid is carried from the tank to the burner regardless of the position of the stove. Other problems involve the uniform distribution of heat, easy replacement of the fuel supply, shielding of the burner and foods from winds and the provision of maximum cooking and heating capacity for a unit of given weight and size.

It is a primary purpose and object of the present invention to provide improved portable stoves for heating and cooking which solve these problems thus providing stoves which have a degree of versatility, portability and range of application not possessed by units of the prior art.

It is a further object of this invention to provide portable stoves intended chiefly for outdoor use, using radiant infra-red burners employing liquefied petroleum gas as fuel, which can be operated in any one of three positions (a) with the burner on top, radiating its heat downward, (b) with the burner below radiating heat upward, (c) with the burner on one side, radiating heat almost horizontally.

It is also an object of the invention to provide such a stove in which the fuel tank automatically adjusts itself to suit each of these three positions, so that in each case the fuel outlet is above the level of the liquid in the fuel tank.

Another object is novel means for attaching the fuel tank to the stove and connecting it to the burner to facilitate quick, easy and safe replacement of the fuel tank.

It is a further object of the invention to provide in such a stove an infra-red radiant burner of unique design, which heats the cooking areas uniformly, avoids heat loss to other places, and is inexpensive to manufacture.

Another object is to provide such a stove which is light and portable, but has great stability, avoiding any danger of tipping over when in use, and so constructed as to protect the food being cooked from heat loss due to winds.

It is a further object to provide such a stove with a pan for grilling, a grid for broiling which also forms a support for cooking utensils, and a perforated plate for warming, all of which are readily positioned for most effective use and are of the maximum size to fit within the walls of the stove casing.

It is an additional object of the invention to provide such a stove which can be manufactured in large quantities at low cost, and which is fabricated chiefly from sheet metal and wire.

Other advantages and objects of the invention will be apparent from the following description, taken in connection with the accompanying drawings, in which:

FIGURE 6 is a fragmentary view of the fuel tank and the tank mounting means;

FIGURE 7 is a longitudinal sectional view of the pivoting and clamping means taken along line 7—7 of FIGURE 6;

FIGURE 8 is a transverse section through the pivot and clamp taken along line 8—8 of FIGURE 6;

FIGURE 9 is a plan view of the burner venturi and mixing chamber, showing the attachment to the stove frame;

FIGURE 10 is a side view of the burner, partly broken away to show the ceramic plate and its support;

FIGURE 11 is a fragmentary view of the radiant face of the burner;

FIGURE 12 is a transverse section through the casing and burner taken along line 12—12 of FIGURE 1; and FIGURE 13 is a fragmentary vertical longitudinal section through the casing taken along line 13—13 of FIGURE 12.

Figure 1:
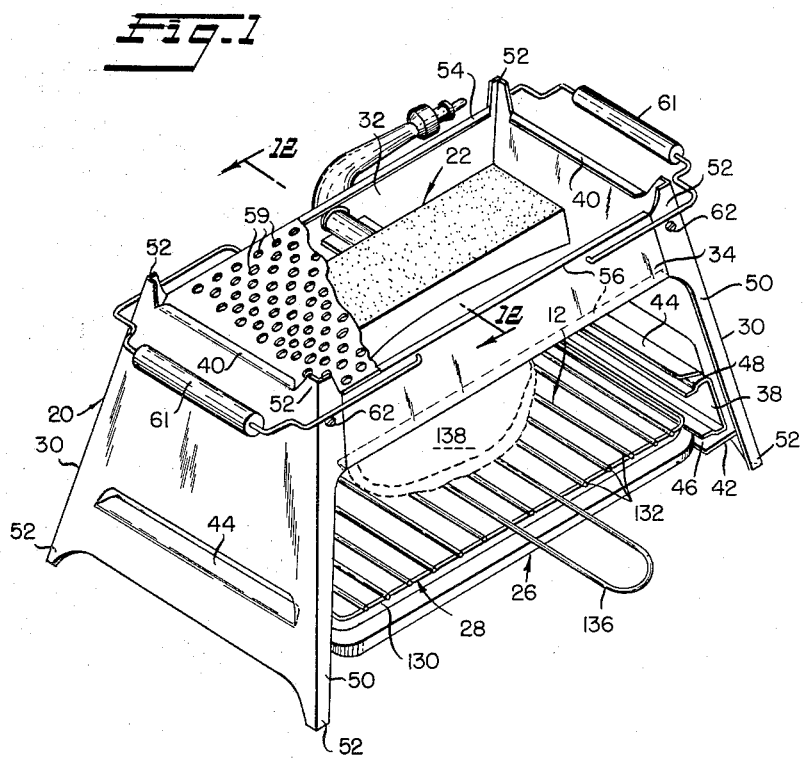
FIGURE 1 is an isometric view of the stove in its broiling position, with part of the perforated warming plate broken away to show the position of the burner.

As shown in the drawings, the principal components of the stove are a casing 20, a burner unit 22, a fuel supply unit 24, a pan 26 for cooking and a rack 28 for grilling.

The casing 20 is shaped as a frustum of a rectangular right pyramid. This shape has several advantages over the conventional stove frame shaped as a rectangular prism. For example, it is more rigid and will withstand much more abuse without distortion, even though made of lighter metal, and is more attractive. When the unit is turned on end for use as a heater (FIGURE 3), the radiation is directed slightly upward, which is desirable when it is placed on the floor. Also it permits the use of handles projecting at each end from the smaller base which do not extend beyond the large base, facilitating packaging.

The casing includes two end panels 30, a back 32, a front channel 34, a burner support channel 36 and two guide channels 38, one of which is attached to each of the two end panels.

Each end panel has a top flange 40, a bottom flange 42, and a center flange 44 formed by shearing through and bending the metal. Flanges 42 and 44 and channel 38 are spaced to form guide slots 46 and 48. These slots serve as supports for the cooking pan 26, slot 46 usually being used when the stove is in broiling position (FIGURE 1) and either slot being used for cooking (FIGURE 2) depending on the intensity of heat required for the specific cooking operation.

Flanges 50 are formed at the front and rear edge of each panel 30 at 90 degrees to the plane of the sheet. These flanges and the metal from which flanges 40 and 42 are sheared form legs 52 at all eight corners of the casing.

The back 32 is a trapezoidal sheet having flanges 54 on its parallel edges, and is spotwelded to the rear flanges 50 of both end panels.

Front channel 34 is also trapezoidal in shape with flanges 56 on its upper and lower edges and is spotwelded at each end to the front flanges 50 of end panels 30.

Back 32 and front channel 34 are welded in such a position that flanges 54 and 56 are in the same plane and slightly below flanges 40.

Burner support channel 36 has flanges 58 on all four sides and its end flanges are spotwelded to back 32 and front channel 34 below the bottom of the burner.

Channel 34 may have an outer facing of anodized aluminum for trim. The inside of the entire casing is sprayed with aluminum paint to reflect radiation striking the interior surfaces back on to the food.

A perforated aluminum plate 59 slides under flanges 40 and rests on flanges 54 and 56 as well as on burner 22. This perforated plate serves as a warming shelf when the stove is used as shown in FIGURE 1.

Figure 2:
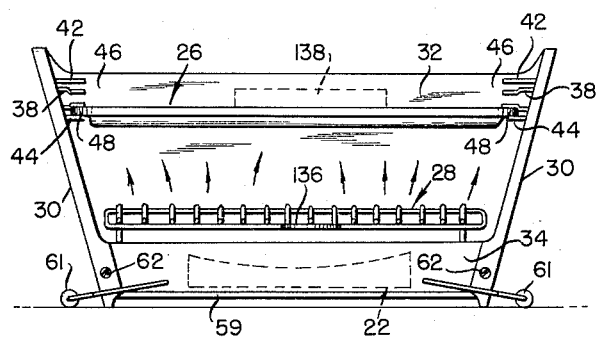
FIGURE 2 is a front elevation of the stove, inverted from the position shown in FIGURE 1, as used for frying or grilling.

Three hooks 60 are sheared from the back. One of these is shown in FIGURES 12 and 13. The other two are in the same horizontal line about six inches to each side. These hooks support the rear bar of rack 28 when it is located as shown in FIGURE 2, the front legs of the rack then resting on channel 34.

Carrying handles 61 formed of wire bails with wooden grips are snapped into holes in back 32 and front channel 34. In the position of the stove shown in FIGURE 1, they rest on pins 62.

Burner assembly 22 comprises a fuel nozzle 63, an air inlet 64 with an adjustable shutter, a venturi tube 66, a mixing chamber 68, two perforated ceramic plates 70 and two wire screens 72. The ceramic plates 70 have about 200 holes per square inch uniformly distributed, each hole being 0.05 inch in diameter. Each plate measures 2 9/16 x 3 5/8 and is slightly less than ½ inch thick. The burner is of the type shown and described in Patent Number 2,775,294 to Gunther Schwank. In this burner a mixture of fuel and air passes from a mixing chamber through a large number of small holes in a ceramic plate, burning on the face of the plate as it leaves the holes. The combustion heats the face of the plate to a temperature of about 1600° F. emitting infra-red radiation.

The two ceramic plates 70 are carried by the mixing chamber 68, one being located on each side of channel 36. The plates 70 are inclined toward each other because radiation from the face of these plates does not travel normal to the surface but scatters in a hemisphere. The inclination of the two plates toward each other compensates in part for such scattering, concentrating more of the radiation on the area where food is placed and producing a more uniform distribution of the infra-red radiation on the food, increasing the efficiency and improving the cooking results.

Plates 70 are supported on the chamber 68 on channels 74 and angles 76, welded to the interior of the mixing chamber walls. The space between the edge of each plate and the adjacent wall of the chamber is filled with a strip 78 of Fiberfrax, a felted material composed of ceramic fibers which is made and sold by The Carborundum Company, Niagara Falls, New York. The Fiberfrax prevents gas leaks around the edges of the plates, permits expansion of the plates when they are heated and cushions the ceramic against damage by shock.

The plates are held in the burner by side strips 80 and end strips 82 which are attached to the face of the mixing chamber with screws. Ribs 84 formed on each strip compress and retain the insulating strip 78.

Two ears 86 are sheared and formed at 90 degrees from each of the side strips 80. Each ear has a slot 88 parallel to and about ¼ inch above the outer surface of the plate. ¼-inch mesh screens 72 made of heat resistant wire such as Nichrome about 3/64 inch diameter, are supported by the slots through which some of the transverse screen wires extend. These screens cover the radiant surface of the plates, are heated by the flame, increase the amount of infra-red radiation emitted, and protect the burner from adverse effects of wind currents.

The burner assembly 22 is supported on channel 36 by a metal plate 92, welded across the chamber 68 between the ceramic plates 70. At one end of plate 92 is an offset tongue 94 which enters a slot in channel 36. Near the other end of plate 92 is a keyhole 96, which is aligned with a nut 98 welded to the under side of channel 36. A screw passing through the keyhole and screwed into the nut attaches the burner assembly which can be removed by loosening the screw and sliding the burner assembly so that the large diameter of the keyhole can be lifted over the head of the screw.

The fuel supply tank 100 is a standard cylindrical bottle containing one-pound of propane. It is supported on rear panel 32 by a swivel connection 102 shown in FIGURES 6, 7 and 8. The tank is loosely encircled by a band 104 which is positioned against a shoulder 106 on tank 100 formed by the enlargement of the drawn shell forming one half of the bottle, where it fits over the other half. The band is located on the bottle above this shoulder so that it is above the center of gravity.

The band has a flat portion 108 which is extended toward the neck of the bottle at 110. At each end of the band there are ears 112, the ears being spaced apart by a shoulder rivet 114. Pivoted on this rivet is a lever 116 which has a cam portion 117 which bears against the bottle.

When lever 116 is at 90 degrees to the axis of the bottle as indicated by the broken line in FIGURE 7, the band is loose, but when it is moved toward the position shown in solid lines, parallel to the bottle, the band is pulled tight around the bottle, locking it in position.

The band is attached to rear panel 32 by two shoulder rivets 118 and 119 which are riveted to the flat area 108 diametrically opposite lever 116. Rivet 118 is free to turn in a hole in the panel 32. Rivet 119 passes through an arcuate slot 120 cut in panel 32 and is free to slide the length of this slot which permits a movement 15 degrees above and below the center of rivet 118. When the fuel tank is in position in the band, it can be tilted freely to angles 15 degrees either way from a line parallel to the base of the heater.

Screwed to the outlet of tank 100 is a control valve 122. This is a standard valve which controls the pressure and rate of flow of the fuel from the tank, and which can be closed to shut off the flow of fuel by operation of knob 124. The fuel tank contains a valve which is closed automatically when valve 122 is not attached.

When in place, valve 122 holds the tank valve open. These are commercial valves, the structure of which forms no part of this invention. Any one of several makes can be used.

The outlet of valve 122 is connected to a flexible hose 126 which connects at its opposite end to burner orifice 63.

Pan 26 is drawn from sheet aluminum. It has a depressed area 127 to hold food and a rim 128 the side flanges of which fit in slots 46 or 48.

Rack 28 has a heavy wire frame 130, with parallel lighter wires 132 running from front to back. The outermost of these wires are formed to provide feet 134 which support and center the rack on pan 26, or can be used to support the front of the rack on channel 34 when the rear of the wire frame is engaged in hooks 60.

A U-shaped wire handle 136 extends from the center in front of the rack. This handle is integral with two of the parallel wires 132.

Figure 4:
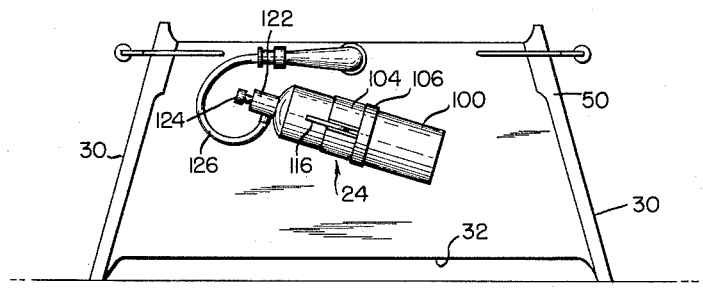
FIGURES 4 and 5 are rear elevations of the stove showing the fuel tank and connections to the burner, with the stove in the same positions as shown in FIGURES 1 and 2 respectively.
Figure 5:
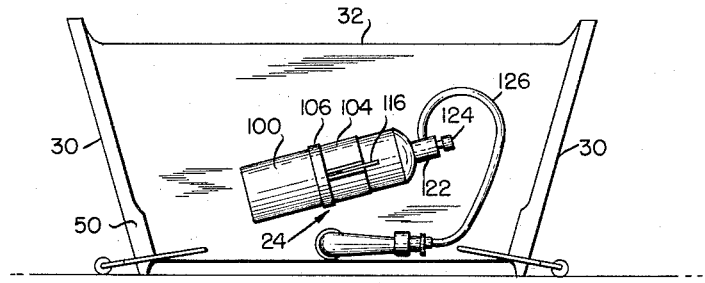
Figure 3:
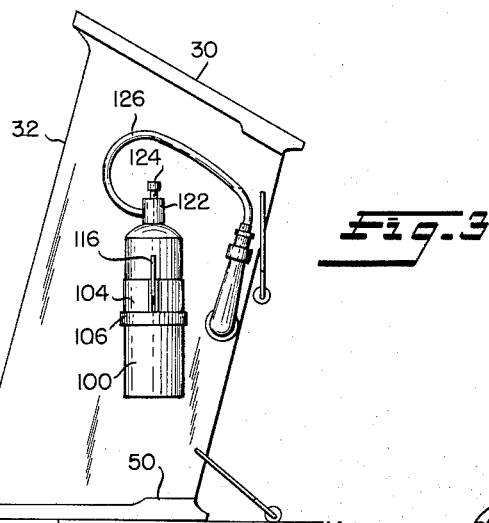
FIGURE 3 is a back elevation of the stove, shown in position for heating.

The stove can be used in any of the three positions shown in FIGURES 1, 2 and 3. Since tank 100 is supported with its center of gravity below pivot 118, the weight of the tank raises automatically the valve end at an angle of 15 degrees from horizontal, whether the stove is in the position of FIGURES 1 and 4, or that of FIGURES 3 and 5. This insures that valve 122 is always above the level of the liquid in the tank (which is never completely full).

When the stove is used for space heating it must always be placed with the valve up as shown in FIGURE 3.

For broiling or toasting, the stove is used as shown in FIGURE 1, with the pan 26 in slot 46, the rack resting on the pan and the food on the rack. At the same time, food can be heated or kept warm on plate 59.

For grilling food directly over the fire, the stove is set up as shown in FIGURE 2, with the back of the rack engaged in the hooks 60 in the rear panel, the front resting on the channel. Also food can be fried or cooked on the pan 26. Both grilling and cooking can be carried on simultaneously. A pot or warming oven can be heated by placing it on the rack. The pan can be used in either of the two positions formed by slides 46 and 48.

The burner is operated by turning knob 124 to open valve 122 then applying a match at the screen 72.

When the tank is empty, it is replaced by moving lever 116, which loosens band 104, then unscrewing the tank from valve 122. The full tank is screwed on to the valve in place of the one removed, then lever 116 turned to tighten band 104.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A reversible portable stove comprising a casing having a rear wall, side walls and a front wall, the front wall being cut away to permit the introduction into and the removal of food from the interior of said casing and the central portion of each of said walls being cut away adjacent their top and bottom edges whereby the remaining portions of said walls form integral legs to provide parallel bases at the top and bottom of said casing on which said stove may rest, a radiant burner supported within said casing and having a gas mixing chamber disposed substantially at the level of the inner ends of the legs of one of said bases, said burner facing the other base, means rigid with said walls for detachably supporting food carriers between said burner and said other base, a carrier on said casing for detachably supporting a fuel supply tank for connection to said mixing chamber and means mounting said carrier for limited pivotal movement on said casing.

2. The portable stove according to claim 1 wherein the means for supporting food carriers comprises flanges struck from the walls of said casing.

3. The portable stove according to claim 1 wherein said radiant burner has two radiant surfaces inclined so that the edge of each surface remote from the center of the stove is closer to said other of said bases than the edge of the surface nearest the center.

4. The reversible portable stove according to claim 1 wherein said carrier comprises a loop adapted to encircle a full tank and means for tightening said loop about a fuel tank together with a flexible valved line for conducting fuel from a tank to said mixing chamber.

5. The reversible portable stove according to claim 1 together with flanges rigid with said casing adjacent said one of said bases for supporting a perforated warming plate closely adjacent said mixing chamber.

References Cited in the file of this patent

UNITED STATES PATENTS

| | | |
|---|---|---|
| 1,903,477 | Rolfson | Apr. 11, 1933 |
| 2,362,415 | Sivley | Nov. 7, 1944 |
| 2,470,645 | Reichart | May 17, 1949 |
| 2,775,294 | Schwank | Dec. 25, 1956 |
| 2,852,654 | Magin | Sept. 16, 1958 |
| 2,893,307 | Rodriguez | July 7, 1959 |

FOREIGN PATENTS

| | | |
|---|---|---|
| 1,238,343 | France | July 4, 1960 |